Feb. 25, 1941.  A. LEWIS  2,233,137
SPOOL FOR GIMP
Filed Sept. 7, 1939
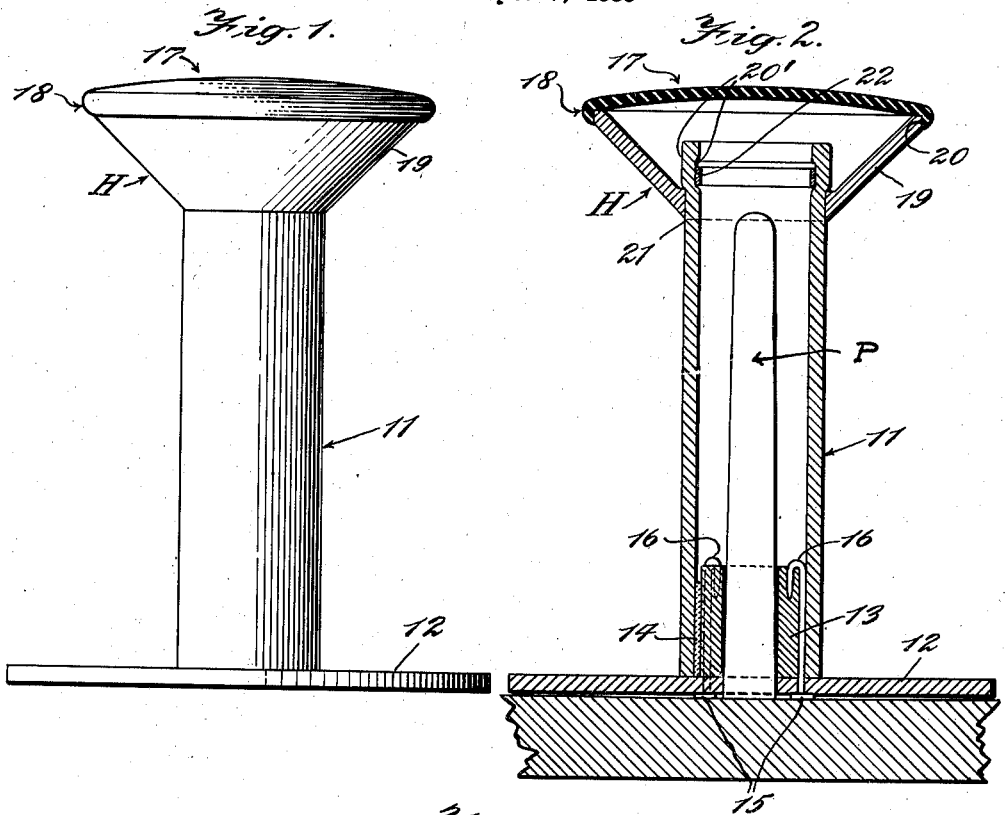
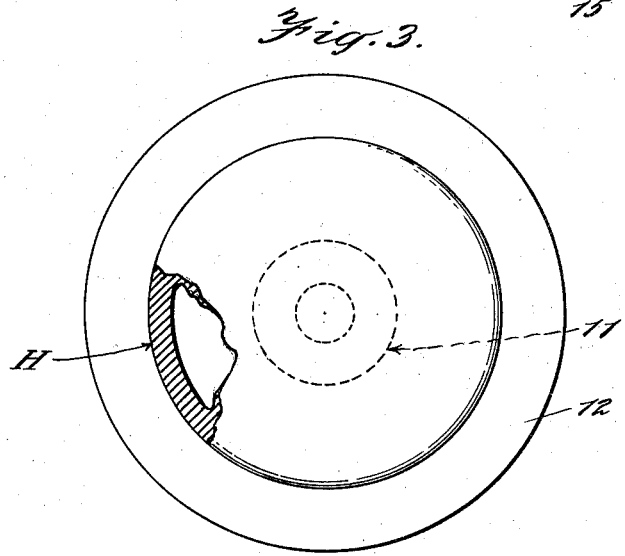
INVENTOR.
Adolf Lewis
BY Waldo M. Chapin
ATTORNEY.

Patented Feb. 25, 1941

2,233,137

UNITED STATES PATENT OFFICE 2,233,137

SPOOL FOR GIMP

Adolf Lewis, New York, N. Y.

Application September 7, 1939, Serial No. 293,677

1 Claim. (Cl. 242—119)

This invention relates to the fabrication of buttonholes, especially to the supply of material of the nature of gimp to machines for making buttonholes by a continuous operation, and relates more particularly to an appliance of the nature of a supply reel to be made and sold as a new article of manufacture for the intended use.

Supply reels for gimp as made and sold at present upon the market comprise spools of conventional shape having the gimp material confined in convolutions between heads of equal diameter upon a barrel intended to be supported upon a horizontal axis and from which the gimp is drawn off in a direction substantially perpendicular to the axis of the spool, the spool rotating upon its axis meanwhile.

It is customary to feed the gimp to the piece goods in which the buttonholes are being made in such continuous fashion that a quantity of gimp adequate for a single buttonhole is applied at the locus of that buttonhole and then without severing the gimp, the operator passes on to the next buttonhole, applying the gimp thereto, and so continuing until the gimp for each of the series of buttonholes has been thus applied, leaving connecting stretches of gimp from buttonhole to buttonhole, which stretches are thereafter severed near each buttonhole.

In such an operation, the rapidity with which each stretch of gimp between buttonholes is run off the spool tends to cause a considerable overrun of the gimp, due to the recurrent jerks upon the gimp and therefore upon the spool or reel upon which the gimp is wound. Accordingly it is the conventional practice to put the spool or reel under an adjustable tension to prevent such overrun, and such adjustable tension means are unsatisfactory for the reason that it is difficult to exert uniform tension or frictional restraint against undue rotation of the spool and consequent overrun of the gimp, and, on the other hand, to avoid putting so much tension or frictional restraint upon the gimp as to cause too great a drag upon the buttonhole machine in taking the gimp off the reel.

When excessive slack is present, it is usually cut away by the operator, to save rewinding, which occupies time that he can devote more profitably in making more buttonholes, for which he is usually paid by the piece, while the material is supplied by the employer, so that there is usually an inordinate amount of waste.

Under such conditions it is the general object of the invention to provide an appliance by which the gimp will be supplied to the buttonhole machine freely at all times, without inordinate waste, and without the employment of restraining means of any nature, and as ancillary objects of the invention may be mentioned the disposal of the supply of gimp in such fashion as to avoid the undesirable irregularities above mentioned, and the disadvantages and inconveniences incidental thereto.

With the above object in view, the invention consists in providing, as a new article of manufacture, a supply reel for material of the nature of gimp, to be used with a machine for making buttonholes, such supply reel being formed with a barrel constructed and arranged to operate around an upright axis, instead of a horizontal axis; and the invention consists further in providing said improved reel with a relatively broad base at its lower end, adapted to afford support for such convolutions of gimp as may, because of the wire-like nature thereof, become more or less loose and fall away from the barrel in use.

The invention consists further in providing, at the upper end of the barrel, a head of lesser diameter, having its periphery formed with a rounded, smooth edge about which the gimp may be freely drawn off in use, the spool meanwhile being loosely mounted upon an upright spindle.

The scope of the invention is such as to include the formation of the barrel, the base and the head as a composite structure in which such parts as the barrel and base are made of strong cardboard or manila board, and the head is made with a conical part of manila board fitted tightly upon the upper end of the barrel, and a larger head made of Bakelite or the like material, smooth and resistant to attrition, which is provided to ensure smooth running off of the gimp.

Other objects and features of the invention will appear as the description of the particular physical embodiment selected for illustration of the invention progresses.

In the accompanying drawing, like characters of reference have been applied to corresponding parts throughout the several views which make up the invention, in which:

Fig. 1 is a view in side elevation of a supply reel in the construction of which the present invention has been embodied;

Fig. 2 is a vertical, medial sectional view of the same, and

Fig. 3 is a plan view of the improved supply reel, as shown in Figs. 1 and 2, but being shown as made in one piece.

In the now-preferred embodiment of the invention selected for illustration and description, the part designated by the reference character 11 constitutes the barrel of the supply reel, being made of any suitable material, preferably strong and light, as for example a hollow piece of the tube made out of manila board stock, upon which are to be wound the convolutions of gimp or other material which is to be applied to the piece goods (not shown) in the operation of fabricating buttonholes in which the gimp is included as a familiar element.

At the lower end of the barrel 11 is provided a base part 12, of annular form, preferably united with the barrel 11 either by integral formation, as indicated in Fig. 3, in the event that such a moldable material as Bakelite or other suitable artificial resin or plastic is used; or made of sheet material, such as a heavy, smooth manila board, or cardboard, as may be found desirable, such a composite structure being easy and cheap to manufacture, lending itself to the fabrication therewith of the head structure H at the upper end of the barrel 11. In the instance illustrated in Figs. 1 and 2, the union between the base 12 and the barrel 11 includes a bushing 13 secured both by cement 14 and nails 15, the latter having their points 16 riveted over, as shown in Fig. 2.

The head H, whether integral with the barrel, as in Fig. 3, or made up of a laminated structure, is characterized by its conformation to the shape of a substantially level disc 17 having a rounded edge 18 about which the gimp is drawn off from the reel, so that there is no tendency toward overrunning, and correspondingly no waste of gimp.

In the structure illustrated in Fig. 2, the under surface of the head piece 17 has a flat central cavity, into which fits a conical member 19, the inner marginal wall 20 being slightly undercut, as indicated, to cause a clipping action of the rim 18 against the edge of the cone 19 which it surrounds. The life of the head member 17 is likely to exceed that of the barrel, base and cone, so that the same head H may be used successively upon a series of the composite spools, if desired.

The upper end 20' of the barrel may be secured both by adhesive, as indicated at 21, and by an expanded ring 22 of metal, forming a joint which is substantially equal in strength to that of an integral structure.

In Fig. 2 the reel is shown as positioned upon an upstanding post indicated by the reference character P.

It will be seen from the foregoing disclosure that the invention provides as a novel article of manufacture an upright supply spool of particular utility for feeding material of the nature of gimp to buttonhole machines in which heretofore exclusive use has been made of horizontal spools; also that the invention provides a supply reel of sturdy construction and novel composite arrangement of parts for general use.

What is claimed is:

As a new article of manufacture, a supply reel of the class described, comprising a barrel having an axial bore, a bushing secured within one end of said bore by a layer of cement, a relatively large disc-like base secured to said barrel by a set of metal fastenings positioned intermediate said bushing and barrel, an inverted hollow cone frustum fitted exteriorly upon, and secured adhesively to, the other end of said barrel, an expanded metal ring disposed within the axial bore of said barrel and by which a portion of said barrel near its end is enlarged to constitute a retaining shoulder for said cone frustum, and a separately formed headpiece of concavo-convex shape having a force fit upon the circumference of said hollow cone frustum, closing the cavity in the cone frustum and presenting a rounded rim surrounding the peripheral edge of the cone frustum.

ADOLF LEWIS.